(12) United States Patent
Englert

(10) Patent No.: US 10,791,393 B2
(45) Date of Patent: Sep. 29, 2020

(54) SPEAKER CASE FOR A MOBILE DEVICE AND SPEAKER SYSTEM WITH SUCH A SPEAKER CASE

(71) Applicant: Klaus Englert, Alzenau (DE)

(72) Inventor: Klaus Englert, Alzenau (DE)

( * ) Notice: Subject to any disclaimer, the term of this patent is extended or adjusted under 35 U.S.C. 154(b) by 0 days.

(21) Appl. No.: 16/212,357

(22) Filed: Dec. 6, 2018

(65) Prior Publication Data

US 2019/0182583 A1 Jun. 13, 2019

(30) Foreign Application Priority Data

Dec. 7, 2017 (DE) .................... 20 2017 107 455 U

(51) Int. Cl.
*H04R 1/02* (2006.01)
*H04R 1/28* (2006.01)
*A45C 11/00* (2006.01)
*H04M 1/11* (2006.01)
*H04M 1/03* (2006.01)
(Continued)

(52) U.S. Cl.
CPC ............ *H04R 1/2811* (2013.01); *A45C 11/00* (2013.01); *G10K 11/08* (2013.01); *H04M 1/035* (2013.01); *H04M 1/04* (2013.01); *H04M 1/11* (2013.01); *H04M 1/185* (2013.01); *H04R 1/025* (2013.01); *A45C 2011/002* (2013.01);
(Continued)

(58) Field of Classification Search
CPC .. H04R 2499/11; H04R 1/345; H04B 1/3888; A45C 2011/002; A45C 2011/003; A45C 2013/025; A45C 2200/15; G06F 2200/1633
See application file for complete search history.

(56) References Cited

U.S. PATENT DOCUMENTS 8,905,231 B2 * 12/2014 Couch, III ............. A45C 11/00
206/320
9,225,377 B1 * 12/2015 Hart ..................... H04B 1/3888
(Continued)

FOREIGN PATENT DOCUMENTS

DE 202011051426 U1 2/2012
DE 202012100042 U1 2/2012
(Continued)

OTHER PUBLICATIONS

English Translation of Abstract of German Patent Application No. 202011051426 dated Dec. 5, 2018.
(Continued)

*Primary Examiner* — Fan S Tsang
*Assistant Examiner* — Ryan Robinson
(74) *Attorney, Agent, or Firm* — McDonnell Boehnen Hulbert & Berghoff LLP

(57) ABSTRACT

A speaker case for a mobile device with a speaker. A protective shell into which the mobile device can be inserted. The protective shell has a rear wall and at least one side wall with an opening for the speaker, a plate-shaped component, which is fastened to the protective shell so as to pivot about a first pivot axis. At least one second plate-shaped component which is pivotally mounted about a second pivot axis on the first plate-shaped component. The pivot axes are preferably perpendicular to each other and whereby the protective shell has a sound channel from the opening for the speaker to the rear wall of the protective shell.

15 Claims, 8 Drawing Sheets

(51) Int. Cl.
  *H04M 1/04* (2006.01)
  *H04M 1/18* (2006.01)
  *G10K 11/08* (2006.01)
  *H04B 1/3888* (2015.01)

(52) U.S. Cl.
  CPC ........ *A45C 2200/15* (2013.01); *H04B 1/3888* (2013.01); *H04R 2499/11* (2013.01)

(56) References Cited

U.S. PATENT DOCUMENTS

| | | | | |
|---|---|---|---|---|
| 9,268,363 | B2* | 2/2016 | Green | G06F 1/1626 |
| 9,318,089 | B2* | 4/2016 | Chang | H04M 1/0202 |
| 9,654,610 | B1* | 5/2017 | Alavian | H04M 1/0237 |
| 9,854,692 | B2* | 12/2017 | Yoo | H05K 5/0234 |
| 9,871,547 | B2* | 1/2018 | Green | H04B 1/3888 |
| 10,200,783 | B2* | 2/2019 | Englert | A45C 15/00 |
| 2011/0266194 | A1* | 11/2011 | Bau | A45C 11/00 |
| | | | | 206/736 |
| 2014/0004012 | A1 | 1/2014 | Miyagawa et al. | |
| 2014/0057685 | A1* | 2/2014 | Shih | H04M 1/0202 |
| | | | | 455/575.1 |
| 2014/0151248 | A1* | 6/2014 | Hurst | A45C 13/1069 |
| | | | | 206/45.23 |
| 2014/0209503 | A1* | 7/2014 | Angel | A45C 11/00 |
| | | | | 206/736 |
| 2014/0238876 | A1* | 8/2014 | Chen | G06F 1/1626 |
| | | | | 206/45.2 |

FOREIGN PATENT DOCUMENTS

| | | | | |
|---|---|---|---|---|
| EP | 2383965 | A1 | 11/2011 | |
| KR | 200467317 | Y1 * | 6/2013 | |
| WO | WO-2014107702 | A1 * | 7/2014 | G06F 1/1632 |
| WO | 2014147410 | A1 | 9/2014 | |
| WO | WO-2016173855 | A1 * | 11/2016 | G06F 1/605 |

OTHER PUBLICATIONS

English Translation of Abstract of German Patent Application No. 202012100042 dated Dec. 5, 2018.

* cited by examiner

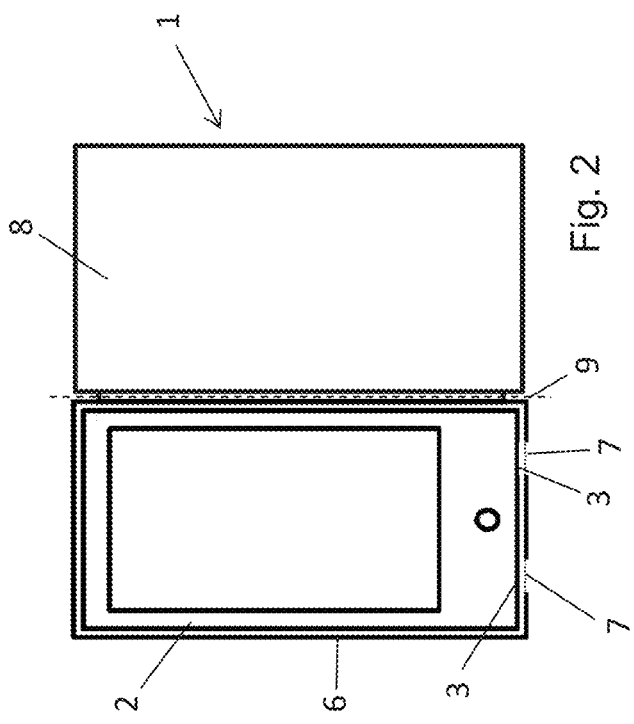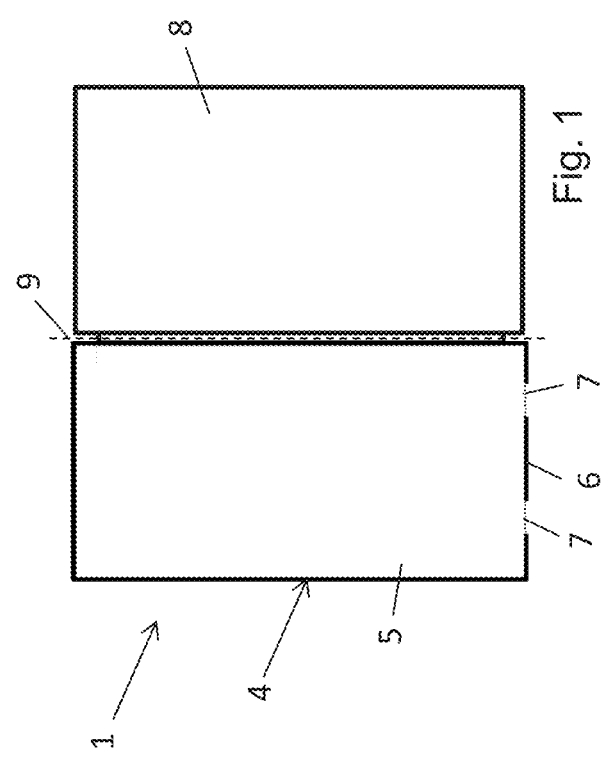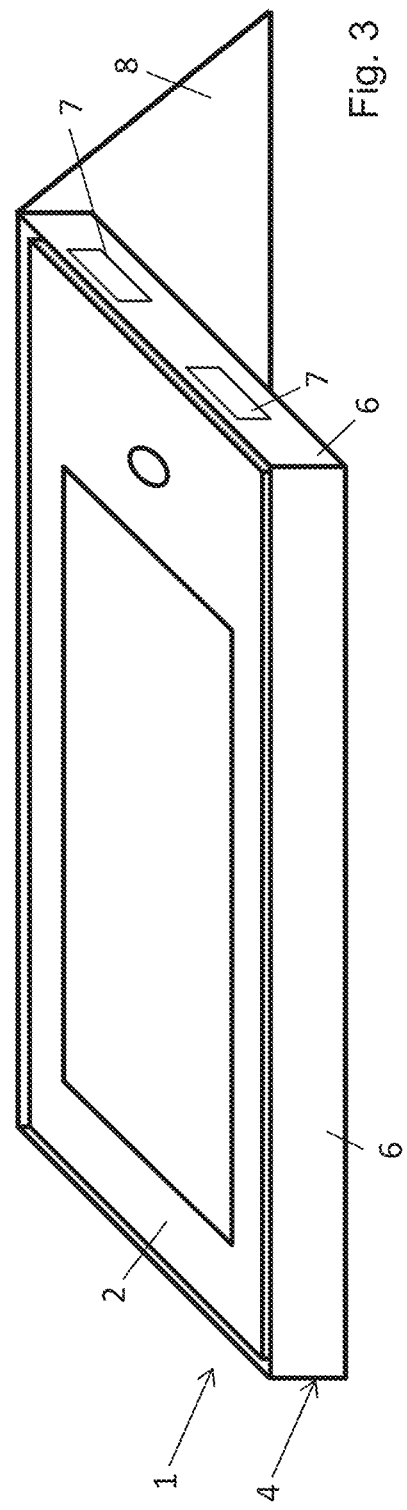

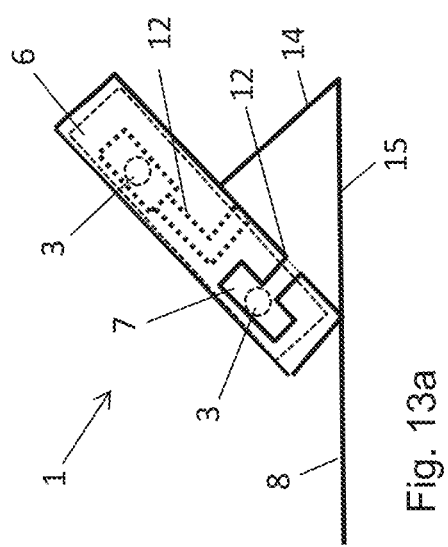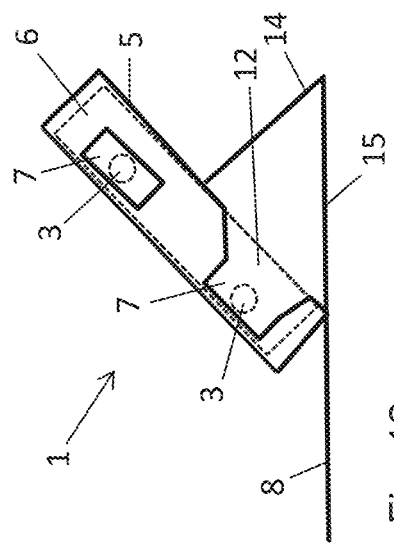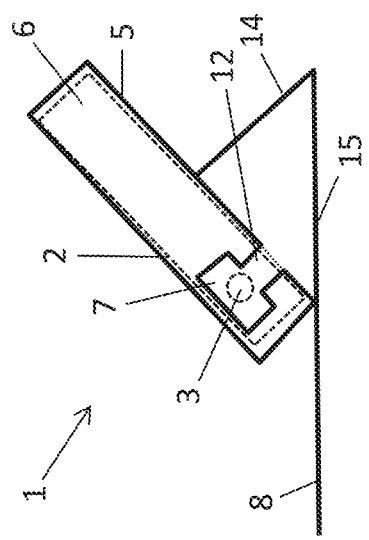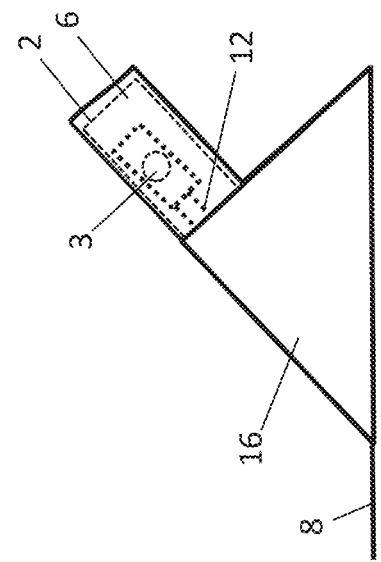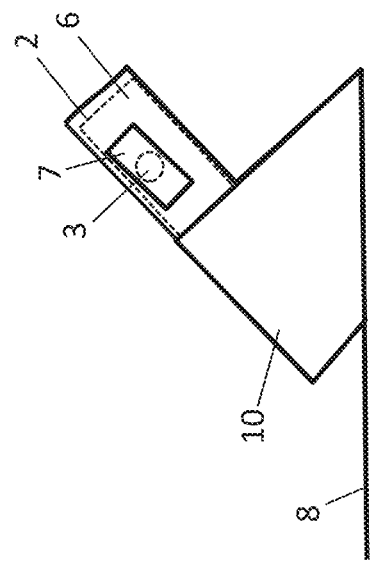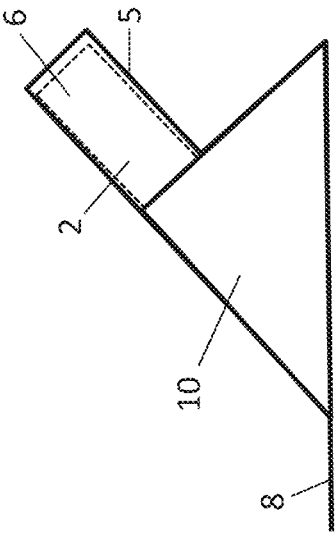

SPEAKER CASE FOR A MOBILE DEVICE AND SPEAKER SYSTEM WITH SUCH A SPEAKER CASE

CROSS REFERENCE TO RELATED APPLICATIONS

The present application claims priority to German Patent Application No. 202017107455.2 filed Dec. 7, 2017, the entire disclosure contents of these applications are herewith incorporated by reference into the present application.

The invention relates to passive sound enhancement for mobile devices with a speaker system in conjunction with speaker cases. In particular, the invention relates to speaker cases for mobile devices with a speaker, such as a mobile telephone, having a protective shell into which the mobile device can be inserted, whereby the protective shell has a rear wall and at least one sidewall with an opening for the speaker and a plate-shaped component, which is pivotally mounted about a first pivot axis on the protective shell.

Many electronic entertainment devices such as mobile phones, MP3 players and tablet computers are becoming increasingly more compact and lightweight and can therefore be constantly carried by the user. Such devices often have a speaker, since the user might want to, for example, listen to music, watch movies and play games with such devices. Due to their compact design, only very small speakers are installed in such devices; therefore, the sound quality suffers, especially in low frequencies.

Computers and smart phones, in particular, are increasingly replacing classic desktop PCs as well as laptops and notebooks. There are, however, certain design disadvantages. Firstly, the sensitive screen is exposed on an outer surface and can therefore be easily scratched or even destroyed. Also, the other surfaces are usually insufficiently protected by the design requirements against damage. Secondly, the screen's angle cannot be tilted toward the user as it can on a laptop because the screen and housing form a single rigid part. Instead, the device must either be lying flat on a surface or held in the hand while operating. Furthermore, due to the compact design, only very small speakers can be installed. Because of these design limitations, there are a variety of accessories to fix, or at least mitigate, these disadvantages.

Protective and support devices for tablet computers and mobile phones come in a variety of different designs. A combination of protective casing and stand can be seen in the EP 2 383 965 A1. Another computer support device with the function of a carrying case is demonstrated in DE 20 2011 051 426 U1. Stable housing with a device for setting up the device can be seen in DE 20 2012 100 042 U1.

Devices for improving the sound characteristics of a mobile device are also well known. These direct, for example, the sound waves generated on the rear wall of a tablet computer forward toward the user. This is demonstrated in the sound guide cover in US 2013/0004012 A1 or the multifunctional cover in WO 2014/147410 A1.

Other variants extend the built-in speakers of a mobile device with a sound and resonance space to improve the sound quality, as seen in the "Sounder Stand" (https://www.kickstarter.com/projects/1034665231 the-sounder-natural-amplifierfor-the-ipad). A higher sound volume than the "Sounder Stand" is offered by the "iBox", designed as a wooden box tablet computer stand (http://www.slashgear.com/ibox-is-25-worth-of-wood-to-hold-your-ipad2891869/). Although the variants with a sound space provide the greatest improvement in the sound quality, they have the distinct disadvantage that they are bulky and heavy. They are therefore not always suitable to carry along with the mobile phone or tablet computer, which are characterized by their compact design and light weight.

The objective is therefore to provide a speaker system that provides adequate protection against damage and also significantly increases the sound quality, especially in the low-frequency range. The design is to be compact and lightweight. The objective is to provide a speaker case for such a speaker system.

The above objective is achieved by a speaker case of the type mentioned in the beginning, which has at least one second plate-shaped component, which is pivotally attached to the first plate-shaped component about a second pivot axis, whereby the pivot axes are preferably at right-angles to each other and the protective shell has a sound channel from the opening for the speaker to the rear wall of the protective shell. The sound channel extends to the back of the rear wall, meaning the side facing away from the mobile device. The sound channel thus represents a conduit from the opening for the speaker to the back of the protective shell.

The opening for the speaker can also be measured and arranged such that several speakers of the mobile device are located in the region of the opening for the speaker. Furthermore, one or more connections, such as a charging connection or an audio connection, may also be located in the area of the opening for the speaker.

A speaker system provides increased sound quality if it has a sound and resonance space in addition to the actual speaker. In order to create a sound box to form a resonance space, at least three sidewalls are required. For example, a prism with a triangular base and a one-sided open-ended face is formed by the three sidewalls, which are designed according to the invention as plate-shaped components and a protective shell, and the surface of a base on which the components are placed. The sound generated by a speaker is then passed through the sound channel to the rear wall of the protective shell and thus, into the sound and resonance space. A particular advantage of the speaker case of this invention is that the first and second plate-shaped component can serve as a support for the protective shell and, therefore, it serves as protection for the mobile device as well because of the pivotability and arrangement of the pivot axes. It is thus possible to hold the mobile device (for example a mobile telephone or a tablet computer) in the desired position by means of the two plate-shaped components.

In order to make such a speaker case portable, the parts of the resonance body can have hinges or other pivotal connections. Thus, the parts can be folded in such a way that the object can lie flat; the plate-shaped components and the rear wall of the protective shell are arranged parallel to and on top of each other. In such a state, the speaker case can be stored easily and in a space-saving manner with the mobile device.

In an erect state, in which the plate-shaped components and the protective shell form the resonance space, the plate-shaped components and the rear wall of the protective shell are at an acute, right or obtuse angle to each other.

In this upright state, the first and second plate-shaped components serve as a support device for the protective shell and the mobile device, which can be contained therein in order to set the mobile device at a particular angle. This is of particular advantage if the mobile device also has a display for displaying content in addition to the speaker. If a user wants to view this display, it can be directed towards the user. The angle of elevation, i.e. the angle between the mobile device and the base, can be adjusted to be at a wider or narrower angle depending on what is required.

In order to be able to form a resonance space between the plate-shaped components and a base in an upright state, the plate-shaped components and the protective shell, in particular the rear wall of the protective shell, must each lie in a plane with one of their side edges. If the system is placed on a base, the surface of this base must lie in this plane, so that the components are flush with this base.

The plate-shaped components and the protective shell then define, together with the plane, a space that is open at the side opposite the second component, whereby the sound channel is directed into the interior of the space.

In its preferred state, the rear wall of the protective shell has a cover, wherein the cover is recessed at the position of the sound channel. The cover may be integrally connected as one part to the first plate-shaped component to protect the mobile device in the shape of a booklet case. The recess also ensures, in this format, that the sound channel creates a continuous connection into the sound and resonance space.

In one version of the invention, the first plate-shaped component may have several segments, which are hinged together. Depending on the size and arrangement of the individual segments, different setup geometries can thus be realized.

In a preferred embodiment, the shapes of the plate-shaped components and the arrangement of the pivot axes may be selected so that in the upright state, the protective shell, in particular its rear wall, and the segments of the first plate-shaped component and the second plate-shaped component define a space which is open on the side opposite to the second component, whereby the sound channel is directed into the interior of the space. In particular, the side surfaces of a three-sided prism may be formed by the segments and the rear wall of the protective shell, whereby a base of the prism is closed by the second plate-shaped component and the opposite end face is open.

In a preferred format of the invention, the second plate-shaped component can rest in the upright state on the sidewall of the protective shell. As a result, the space is closed in this direction so that the opening opposite the second plate-shaped member is the only opening in the space. This leads to particularly good sound and resonance properties.

In a particularly preferred embodiment of the invention, the second plate-shaped component can cover the speaker opening in the protective shell in the upright state. The sound waves are therefore conducted in a closed channel from the speakers of the mobile device to the sound and resonance space. In the flat state, the opening for the speaker is not covered and thus is open to the outside, so that the speakers, in this case, have their normal emission characteristics. If the mobile device is stored unused, it is typically placed facedown or faceup.

Since the opening for the speakers on the sidewall are not covered, the sound waves can be emitted unhindered. For example, the ring of a mobile phone is not dampened. A deflection of the sound waves in the direction of the back of the protective shell therefore only happens in the upright state, while in the flat state, no deflection of the sound waves takes place.

In a preferred embodiment of the invention, the sound channel may be formed as a continuous recess of the protective shell. This means that the sound channel forms a connection from the inside of the protective shell to the outside of the protective shell. In an erect condition, the second plate-shaped component can then also cover the sound channel. With inserted mobile device, the sound channel thus runs in the sidewall and is delimited below by the mobile device and above by the second plate-shaped component.

In a preferred embodiment of the invention, the sound channel may be formed as a one-sided recess of the protective shell. That is, the protective shell is not completely penetrated to form the channel; it is only recessed. This recess can be located on the outside of the protective shell. The outside is the side of the protective shell facing away from the mobile device. This can prevent the sound waves generated by the speaker from partially penetrating through a small gap between the protective shell and the mobile device, particularly if the connection between the sidewall and the mobile device is not sealed, which thus alters the sound characteristics. The sound channel, therefore, runs as a recess in the sidewall and is covered to the outside in the upright state by the second plate-shaped component. Alternatively, the sound channel can be designed as a recess on the inside of the protective shell. This is advantageous in areas that cannot be covered by the second plate-shaped component. The sound channel, therefore, runs as a recess in the sidewall and is covered by the mobile device.

In a further alternative embodiment of the invention, the sound channel can run completely within the protective shell. The sound channel, therefore, forms a closed channel independently of the second plate-shaped component and is closed on all sides by areas of the protective shell. The sound channel can be designed, for example, as a hole in the protective shell.

The sound channel may also have any desired combination of these embodiments and be designed differently in different areas.

In a preferred embodiment, the sound channel runs in the sidewall and/or the rear wall of the protective shell. If the sound channel continues in the rear wall of the protective shell, then the sound output can be adapted to the sound and resonance space and thus the sound behavior. In particular, in combination with a sound channel running inside the protective shell or a sound channel designed as a one-sided recess, which is only opened inwards, the exit point of the sound channel in the sound and resonance space can thus be arbitrarily selected in order to control the sound characteristics.

In a preferred embodiment of the invention, the sound channel can extend over the full width of the opening for the speaker. Such an embodiment is particularly easy to manufacture, since the opening for the speaker and sound channel are designed as a common recess.

In a preferred embodiment of the invention, the sound channel can expand starting from the opening for the speaker. Thus, the sound waves are directed to the rear wall of the protective shell and thus into the sound and resonance space with particularly low losses.

In a preferred embodiment, a third plate-shaped component is hinged, in particular to the first plate-shaped component on the side opposite to the second plate-shaped component. This embodiment is particularly suitable for mobile devices in which speakers are arranged on two opposite side edges. In particular, openings for the speakers can then also be arranged with a sound channel on the side of the third plate-shaped component. Thus, the sound behavior can be adjusted by opening and closing the individual plate-shaped components. By closing both sides, the volume can be greatly attenuated; for example, one can hold a short conversation without having to adjust the volume on the mobile device.

The objective is also achieved by a speaker system with a mobile device that has a speaker, and a speaker case according to one of the above embodiments, whereby the mobile device is inserted into the protective shell of the speaker case and the opening for the speaker is placed in the protective shell at the position of the speaker of the mobile device.

In a preferred embodiment, the first plate-shaped component or a segment of the first plate-shaped component rests on a display device of the mobile device when in the flat state. This protects the display from damage.

In addition to the mobile device, other components may have one or more speakers. Each speaker, which is oriented with its opening directly or via a sound channel in the space formed by the components, contributes to the overall sound of the speaker system.

The second plate-shaped component may, for example, have a basic triangular shape. A side edge of the component, the lower edge, lies flat and thus forms the connection to a base. The front edge of the component is adjacent to the protective shell, and the rear edge is adjacent to the first plate-shaped component. The angle between the lower edge and the front edge is thus identical to the setup angle of the protective shell, and the angle between the lower edge and the rear edge corresponds to the angle of inclination of the first component.

In order to achieve particularly high stability in the upright state, the angle of inclination of the first plate-shaped component, i.e. the angle of the second plate-shaped component between the lower edge and the rear edge, can be less than 90°.

In order to achieve a particularly good resonance effect, it is important that the sound space has only one opening. It is therefore important to ensure that the individual components fit with each other as firmly as possible. To achieve this, the pivotable connection according to the invention between the first component and the second component may be formed as a spring-assisted hinge. As a result, the second component is held in contact with the protective shell by a spring.

Alternatively, or in addition, the connection between the protective shell and the second component can also be secured magnetically. If the protective shell has ferromagnetic properties, the magnet pulls the second component flush against the sidewall of the protective shell and thus leads to completely closed contact.

The connection between the first plate-shaped component and the second plate-shaped component can also be affected according to the invention by a clamping bar with a hinge. The hinge ensures the foldability of the connection and the clamping bar allows the connection to be reversibly connected and disconnected. The hinge and clamping bar can also be formed as a unit.

If the connection is to be permanent, the second and first plate-shaped components can also be formed in one piece. The pivotability at the connection point is achieved, for example, by a reduced thickness through the use of a film hinge and/or another flexible material.

It can further be provided that the second and the first plate-shaped components do not simply rest on one another in a flat-lying state, but that the first component has a recess into which the second component fits. For this, an area of the first component has a reduced thickness, e.g. the exact thickness of the second component. As a result, the recess is filled by the second component. The recess can also be slightly larger than the second component to allow easy folding and unfolding.

If a user wants to move the parts from a folded state to an open state, they must be able to grip the second component. For this purpose, it may also be provided to enlarge the recess in the first component, for example, at the position of the tip of the second component so that the second component can be gripped with two fingers.

The invention will be explained in the following with reference to exemplary embodiments and with reference to the figures. All described and/or illustrated features alone or in any combination form the subject matter of the invention, regardless of their summary in the claims or their references.

It is shown:

FIG. 1 is a plan for a protective case for a mobile phone;

FIG. 2 is a plan for a protective case with inserted mobile phone;

FIG. 3 is a perspective view of an upright protective case according to the prior art;

FIG. 11a shows a side view of an embodiment of the system according to the invention;

FIG. 11b shows a side view of the embodiment of FIG. 11a with sound panel;

FIG. 12a shows a side view of an embodiment of the system according to the invention;

FIG. 12b shows a side view of the embodiment of FIG. 12a with sound panel;

FIG. 13a shows a side view of an embodiment of the system according to the invention;

FIG. 13b shows a side view of the embodiment of FIG. 13a with sound panel;

Figure 5:
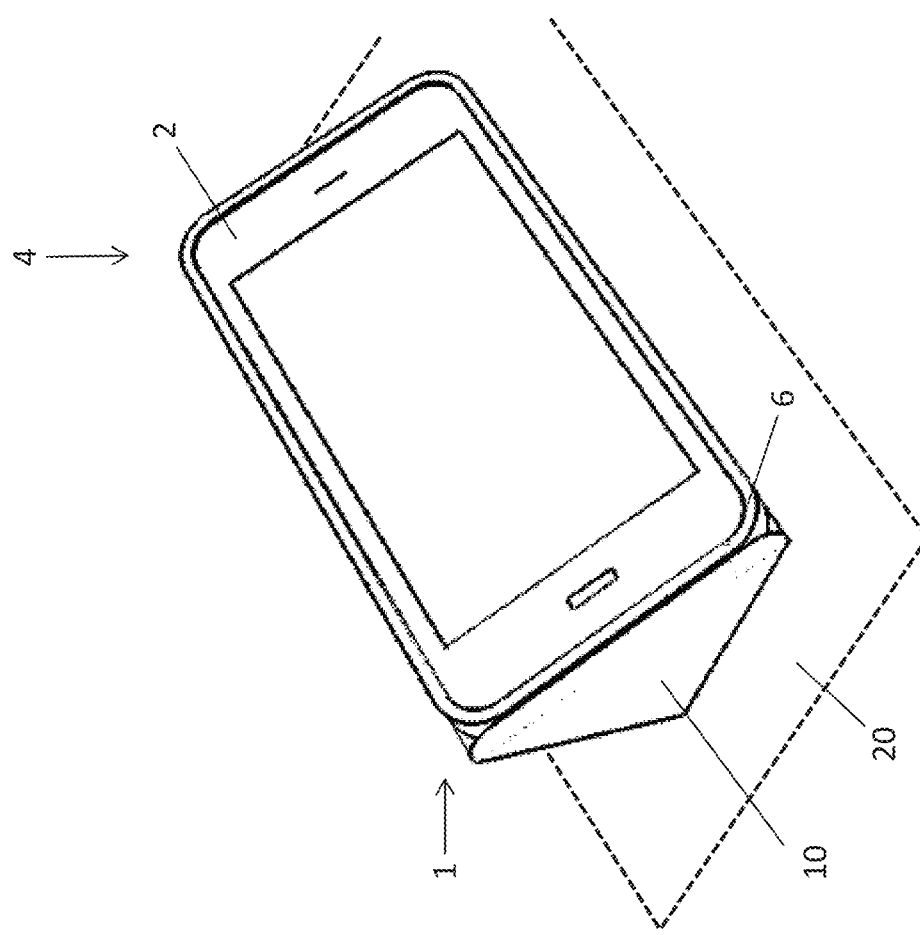
FIG. 5 is a perspective view of an upright speaker system according to the invention.

FIG. 1 shows a plan for a protective case for a mobile phone 2. This essentially consists of a protective shell 4 into which the mobile telephone 2 can be inserted, and a first plate-shaped component 8, which is designed as a cover 8 and is hinged about a first pivot axis 9 to the protective shell 4. The protective shell 4 has a rear wall 5 and at each of the edges has a sidewall 6. The lower sidewall 6 also has two openings for the speakers 7.

The mobile phone 2 can, as shown in FIG. 2, be set into the protective shell 4 such that the back of the mobile phone 2 rests against the rear wall 5 of the protective shell 4 and the sidewalls 6 sit against the respective side edges of the mobile phone 2. The sidewalls 6 may have a narrow ledge that protrudes into the interior of the protective shell 4 to fix the inserted mobile phone 2 in the protective shell 4. The mobile phone 2 has two speakers 3 at the lower edge.

The openings for the speakers 7 of the protective shell 4 are arranged at the position of the speakers 3 such that the speakers 3 are not covered by the sidewall 6 of the protective shell 4. The cover 8 can be folded to protect the screen of the mobile phone 2 in front of the protective shell, so that the cover 8 rests on the screen of the mobile phone 2.

FIG. 3 shows a protective cover with mobile phone 2 in an upright state. The cover 8 serves as a support device for the protective shell 4 and the mobile phone 2 inserted therein. If, for example, videos or music are played on the mobile phone 2, the sound waves generated by the speakers 3 can pass through the openings for the speakers 7 of the protective shell 4.

Protective cases for mobile phones, such as those shown in FIGS. 1 to 3, exist in number variations based on the prior art.

Figure 4:
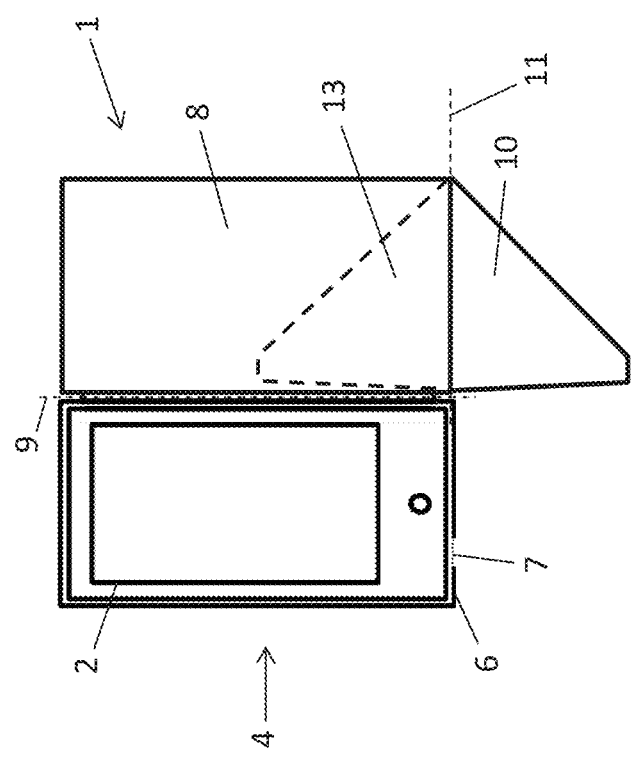
FIG. 4 is a plan for a system according to the invention.

FIG. 4 shows a speaker system according to the invention with a mobile telephone 2 and a speaker case 1 in a flat state. The system has a second plate-shaped component 10, which is referred to below by way of example as sound panel 10 and is hinged to the lower edge of the cover 8 on a second pivot axis 11. Protective shell 4, cover 8 and sound panel 10 are completely unfolded and lie in one plane. A recess 13 is provided in the cover 8. The recess corresponds in shape to the shape of the sound panel 10. It is thus possible to fold the sound panel 10 onto the cover 8, such that it is sunk into the cover 8. The cover 8 can then be folded with the sound panel 10 folded in along the pivot axis 9 on the mobile phone 2. In this flat state, the mobile phone 2, the rear wall 5 of the protective shell 4, the cover 8 and the sound panel 10 are parallel to each other.

The protective shell 4 of the embodiment also has only one single opening for the speaker 7. Many mobile phones 2 have a dummy speaker at their lower edge for design reasons and only have one functional speaker 3. Therefore, only one opening for the speaker 7 must be provided in the protective shell 4.

FIG. 5 shows a speaker system according to the invention in an upright state.

The protective shell 4, cover 8 and sound panel 10 lie in each case with one of its side edges in plane 20. The sound panel 10 is essentially designed triangularly, whereby two corners are flattened to close flush with the protective shell 4.

The sound panel 10 has a lower edge, a rear edge and a front edge. The sound panel 10 is attached on the rear edge to the cover 8, stands with the lower edge on the surface lying flat 20 and fits closely on the front edge to the sidewall 6 of the protective shell 4. As a result, a space is formed in the upright state by the cover 8, sound panel 10, protective shell 4 and base, which is open only in a partial area. The open partial area of this space is located on the opposite side to the sound panel 10.

Figure 6:
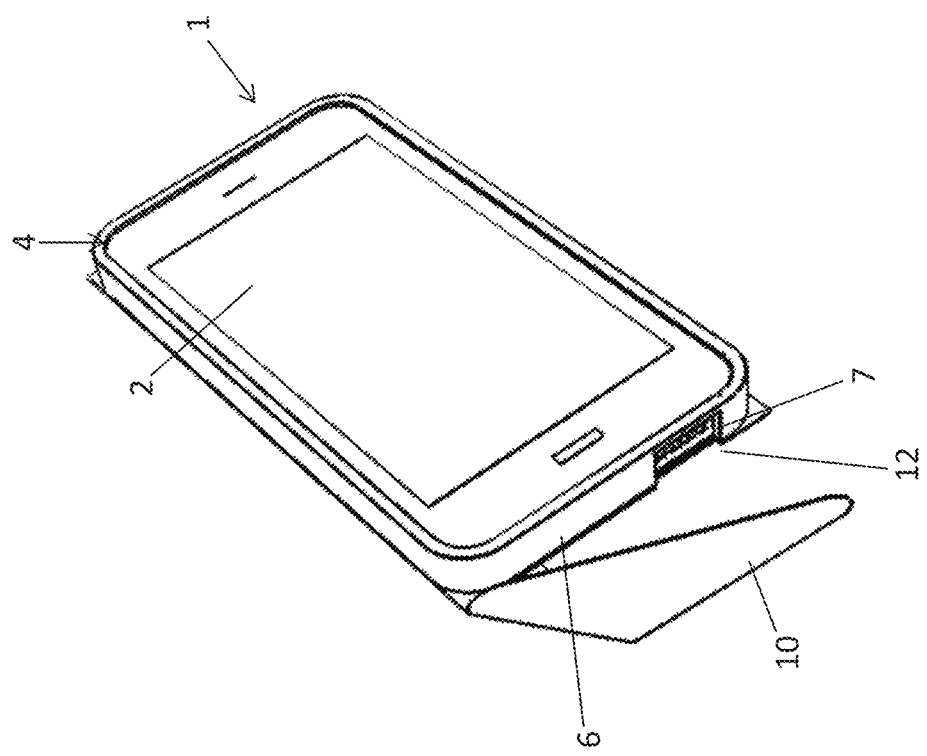
FIG. 6 is a perspective view of an upright speaker system according to the invention with open sound panel.

In order to be able to act as a sound and resonance space for the speaker 3 of the mobile telephone 2, the sound waves emanating from the speaker 3 must be directed into the space formed by the cover 8, sound panel 10 and protective shell 4. FIG. 6 shows a format for the invention in which the sound panel 10 is slightly open for illustration purposes. The protective shell 4 has a sound channel 12 on the sidewall 6 for the opening for the speaker 7. This is designed as a recess in the sidewall 6 and extends from the opening for the speaker 7 to the rear wall 5 of the protective shell 4 and, in particular, to the back of the rear wall 5 into the sound and resonance space. The sound channel 12 extends over the entire width of the opening for the speaker 7. The opening for the speaker 7 and the sound channel 12 are therefore formed as a common recess in the sidewall 6 of the protective shell 4, which are covered by the sound panel 10 in the upright state. The sound waves are therefore conducted in a closed channel from the speaker 3 of the mobile phone 2 to the sound and resonance space. In the flat state, the opening for the speaker 7 and sound channel 12 are open to the outside so that the speaker 3 in this case has its normal emission characteristics. If the mobile phone 2 lies on its back or front side, the sound waves can be released unhindered. For example, the ring of a mobile phone is not attenuated. A deflection of the sound waves happens therefore only in the upright state, while in the flat state, no deflection of the sound waves takes place.

The space formed by the rear wall 5, cover 8, sound panel 10 and the base can therefore serve as sound and resonance space for the speaker 3 of the mobile telephone 2 and thus lead to a significant improvement in the sound characteristics. The setup angle of the mobile phone 2 is determined by the angle of the sound panel 10 between the front edge and lower edge and can be any acute angle and thus create a support device for very flat to very steep setup angles of the mobile phone 2 as needed.

Figure 7:
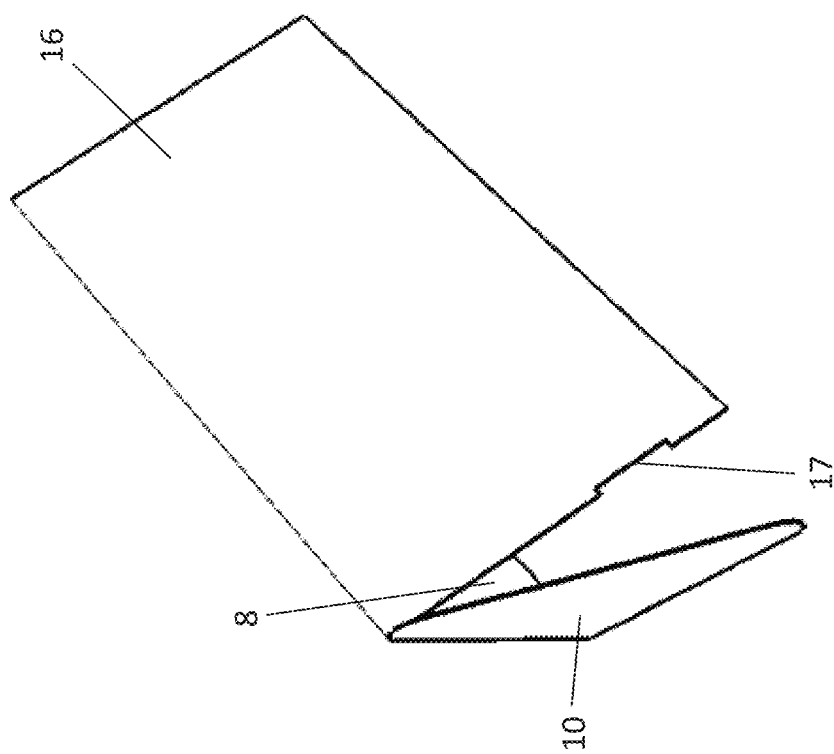
FIG. 7 is a perspective view of an upright speaker system according to the invention without a protective shell.

The rear wall 5 of the protective shell 4 also has a cover 16, which is integrally connected to the cover 8. The cover 16 can be seen in the illustration shown in FIG. 7 without a protective shell 4. The cover 16 has a recess 17, which connects the sound channel 12 with the sound and resonance space. The cover 16 forms a booklet case for a mobile phone with the cover 8.

Figure 8:
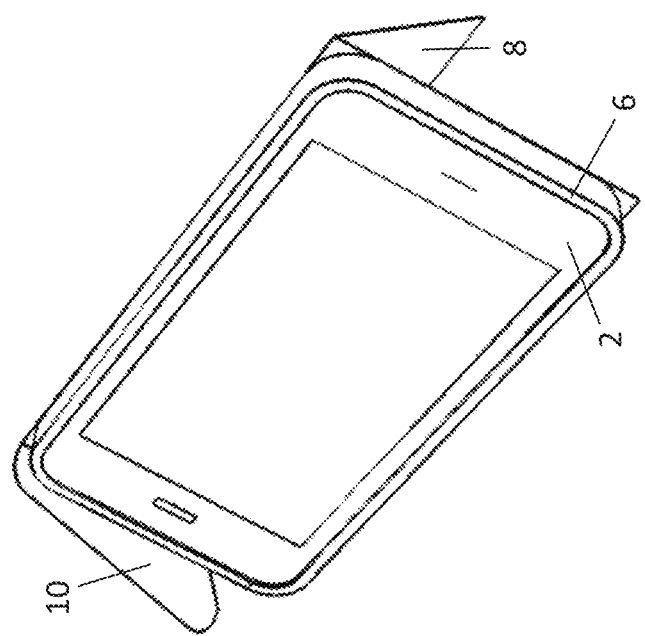
FIG. 8 is a rotated view of an upright speaker system according to the invention.

FIG. 8 shows an illustration of the invention with a view of the open side of the resonance space. When the sound panel 10 is closed, this opening forms the only opening of the sound and resonance space, by means of which the sound is emitted to the surroundings.

Figure 9:
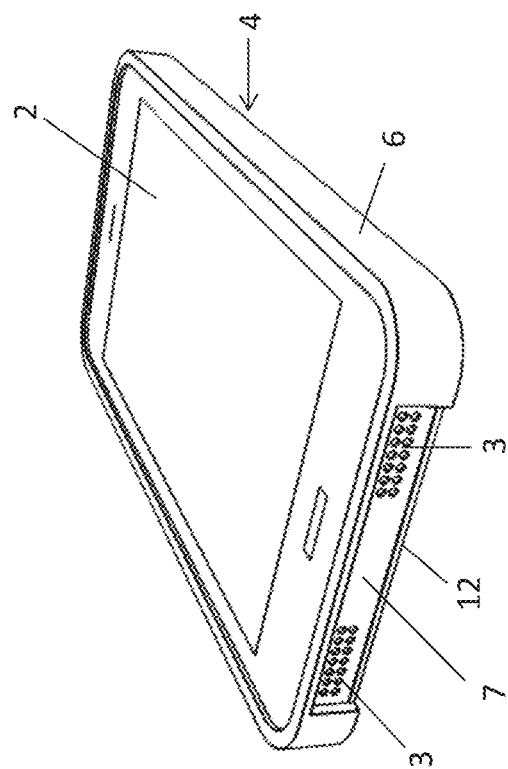
FIG. 9 is a perspective view of a protective shell of an embodiment for two speakers.

FIG. 9 shows the protective shell 4 of an embodiment with two speakers 3, wherein a single opening for the speaker 7 extends over both speakers 3. The sound channel 12 extends over the full width of this opening for the speaker 7.

Alternatively, the one common opening for the speaker 7 could be equipped with one separate sound channel 12 for each of the speakers 3.

Figure 10:
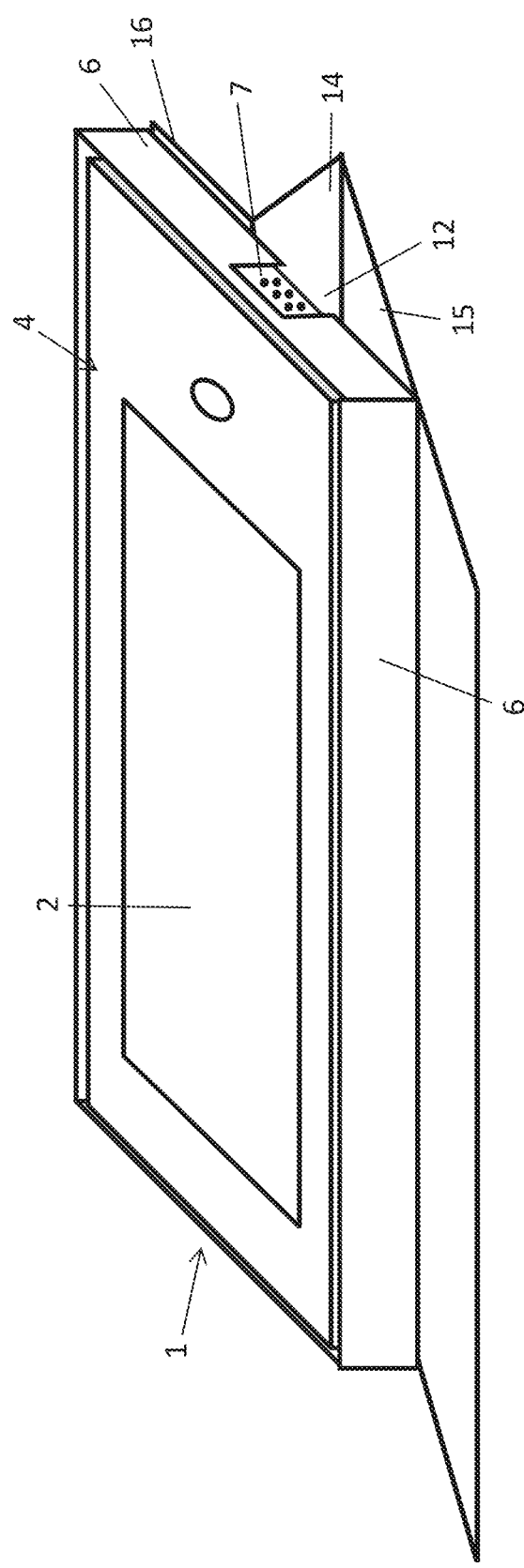
FIG. 10 shows a perspective view of a further embodiment of the system according to the invention without sound panel.

The cover 8 is constructed in one embodiment from several segments 14, 15 which are interconnected so that they can be folded at the connection points. A foldable connection is typically realized by thin, flexible material between the segments 14, 15. One format with such a cover 8 is shown in FIG. 10. By flipping over the segments 14, 15 a supporting device for the mobile phone 2 can be made from the cover 8. With this, the mobile phone 2 can be set up at an angle, as can be seen in the perspective view in FIG. 10. The first segment 14 of the cover 8 is articulated approximately centrally on the protective shell 4. In the illustrated upright state, the second segment of the cover 8 lies flat on the base. The sound panel 10 is not shown in FIG. 10 but in this format it lies with its lower edge against the second segment 15 of the cover 8, with its rear edge on the first segment 14 of the cover 8 and with its front edge on the sidewall 6 of the protective shell 4. A sound and resonance space is thus formed by the protective shell 4, in particular the rear wall 5 of the protective shell 4, the first and second segment 14, 15 and the sound panel 10. This embodiment therefore does not require a flat base to create a sound and resonance space, but can also be held in the hand, for example.

Also, in this embodiment, the rear wall 5 of the protective shell 4 has a cover 16, which is integrally connected to the cover 8. The cover 16 extends only over a partial area of the rear wall 5, whereby in a flat-lying state, the first segment 14 rests against the remaining portion of the rear wall 5 of the protective shell 4.

However, since the first segment is folded away from the rear wall 5 in an erect state, it does not need to have a recess.

FIG. 11a shows a side view of an alternative embodiment, wherein the mobile device 2 with its speakers 3 is indicated by dashed lines. The sound channel 12 of the opening for the speaker 7 has a smaller width than the opening for the speaker 7 and extends from the opening for the speaker 7 to the rear wall 5 of the protective shell 4 into the interior of the sound and resonance space. In FIG. 11b, the embodiment of FIG. 11a with sound panel 10 is shown. The sound panel 10 has a triangular shape and is hinged to the second segment 15 of the cover 8. It lies against the sidewall 6 of the protective shell 4 such that the opening for the speaker 7 and the sound channel 12 are covered and thus form a closed channel into the interior of the space.

Another embodiment is shown in FIG. 12a in a side view. The sound channel 12 has the full width of the opening for the speaker 7 and extends, starting from the opening for the speaker 7 in the direction of the rear wall 5 and continues from the speaker 3 of the mobile phone 2 to the rear wall 5 of the protective shell into the interior of the sound and resonance space. In FIG. 12b, the embodiment of FIG. 12a with sound panel 10 is shown. The sound panel 10 has a triangular shape, wherein a corner is flattened to close flush with the protective shell 4.

The sound panel lies against the sidewall 6 of the protective shell 4 in such a way that the opening for the speaker 7 and the sound channel 12 are covered and thus form a closed sound channel into the interior of the space. The embodiment, furthermore, has a second opening for the speaker 7 above a second speaker 3. This opening for the speaker 7 has no sound channel into the interior of the space and is not covered by the sound panel 10. The combination of speakers 3 inside and outside of the space can influence the sound of the speaker system.

Another embodiment is shown in FIG. 13a in a side view. The sound channel 12 of the opening for the speaker 7 has a smaller width than the opening for the speaker 7 and extends from the opening for the speaker 7 to the rear wall 5 of the protective shell 4 into the interior of the sound and resonance space. The mobile phone 2 also has a second speaker 3. Over this second speaker 3, there is no opening for the speaker 7. Instead, the sidewall 6 of the protective shell 4 has a sound channel 12 which runs completely within the sidewall 6. The sound channel begins over the speaker 3 of the mobile phone and ends at the rear wall 5 of the protective shell, so that a closed sound channel from the speaker to the inside of the space exists. In FIG. 13b, the embodiment of FIG. 13a with sound panel 10 is shown. The sound generated by the second speaker 3 can therefore be directed into the interior of the sound and resonance space without the sound panel having to cover the area over the speaker.

Figure 15:
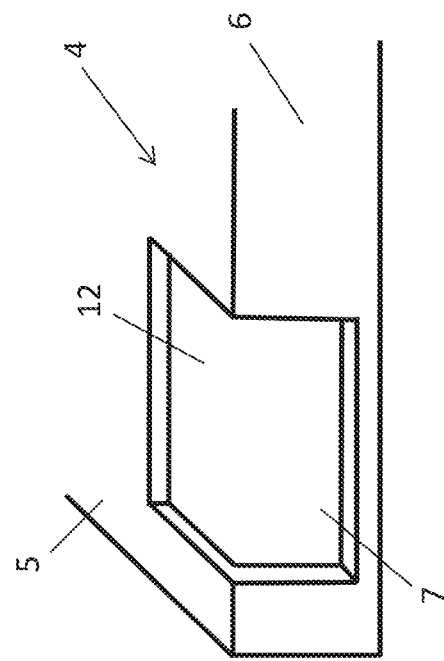
FIG. 15 shows a further perspective view of an opening for the speaker with sound channel.
Figure 14:
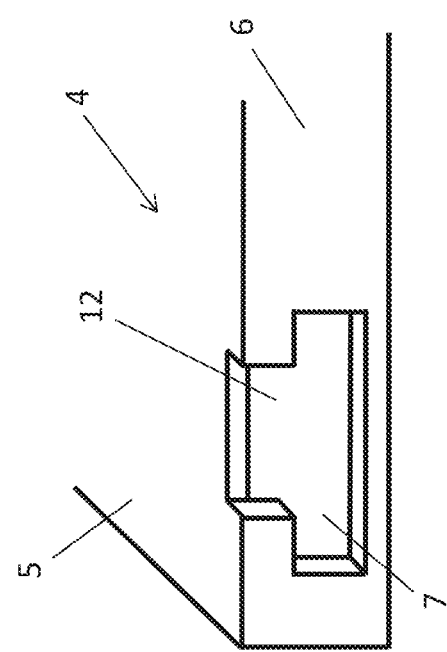
FIG. 14 shows a perspective view of an opening for the speaker with sound channel.

FIGS. 14 and 15 each show a perspective view of a detail of a rear side of a protective shell 4 according to the invention with the rear wall 5 and a sidewall 6.

FIG. 14 shows an opening for the speaker 7 in the sidewall 6, which is connected with a narrower sound channel 12 from the opening for the speaker 7 to the rear wall 5 to the back of the protective shell 4.

FIG. 15 shows the same section of an embodiment with a sound channel 12, which extends over the full width of the opening for the speaker 7. The sound channel 12 begins at the opening for the speaker 7 in the sidewall 6 and continues in the rear wall 5.

Figure 16:
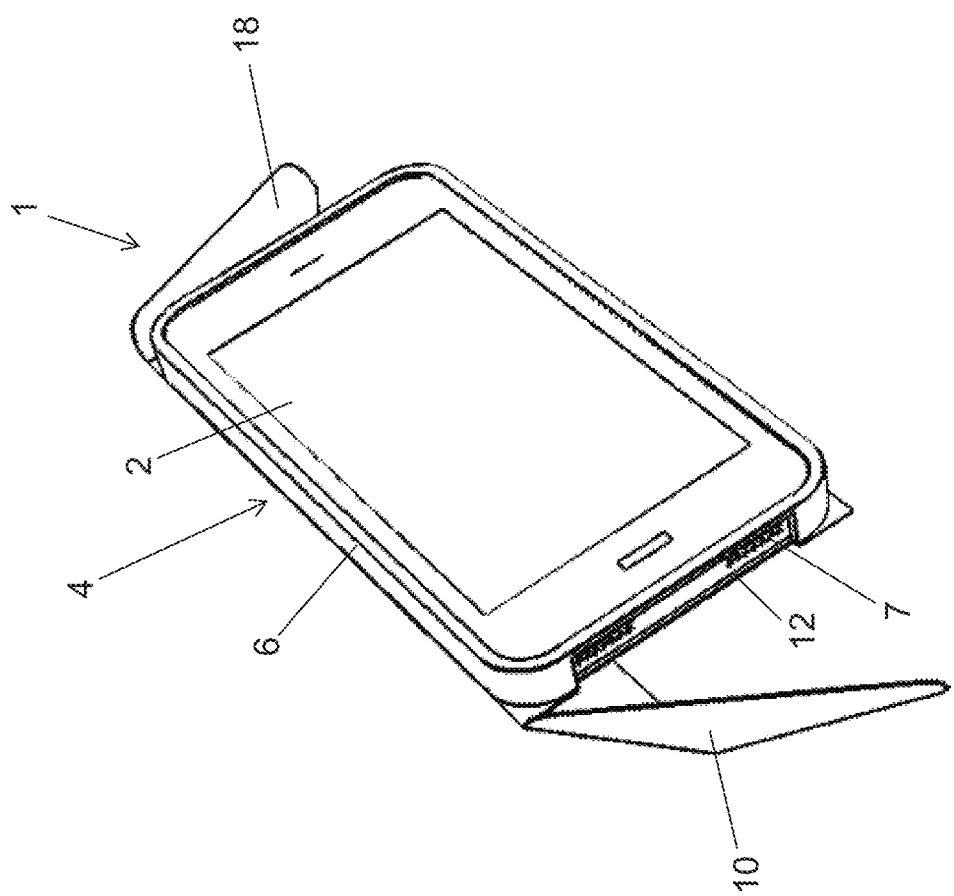
FIG. 16 shows a perspective view of a further embodiment of the system according to the invention with two sound panels.

FIG. 16 shows an embodiment with a second sound panel 18. This is hinged on the side of the cover 8 which is opposite to the first sound panel 10. By opening and closing the individual sound panels 10, 18, the sound behavior can be adjusted. This embodiment is particularly suitable for mobile devices 2 in which speakers 3 are arranged on two opposite side edges.

Due to the design with plate-shaped components, the speaker system according to the invention can be folded together and thus stowed away in a space-saving manner for transport. At the same time, it forms a resonance space in an upright state, which ensures a good sound quality.

LIST OF REFERENCE NUMBERS

1 Speaker case
2 Mobile telephone
3 Speaker
4 Protective shell
5 Rear wall
6 Sidewall
7 Opening for the speaker
8 Cover
9 First pivot axis
10 Sound panel
11 Second pivot axis
12 Sound channel
13 Recess for sound panel
14 First segment
15 Second segment
16 Cover
17 Recess
18 Second sound panel
20 Plane

The invention claimed is:

1. A speaker case for a mobile device with a speaker, comprising:
   a protective shell into which the mobile device can be inserted, whereby the protective shell has a rear wall and at least one side wall with an opening for the speaker; and
   a first plate-shaped component, which is fastened to the protective shell so as to pivot about a first pivot axis, wherein the speaker case further comprises at least one second plate-shaped component which is pivotally mounted about a second pivot axis on the first plate-shaped component, whereby the pivot axes are preferably perpendicular to each other and whereby the protective shell has a sound channel from the opening for the speaker to the rear wall of the protective shell, wherein the rear wall has a cover that is integrally connected to the first plate-shaped component and the cover has a recess at the position of the sound channel.

2. A speaker case according to claim 1, characterized in that the rear wall of the protective shell, the first plate-shaped component and the second plate-shaped component from a flat-lying state in which the first and second plate-shaped component and the rear wall of the protective shell are aligned parallel to each other, can be converted into an upright state, in which the first and second plate-shaped component and the rear wall of the protective shell each form an acute, right or obtuse angle.

3. A speaker case, according to claim 2, characterized in that the shapes of the two plate-shaped components and the arrangement of the pivot axes are selected such that in the upright state the first and second plate-shaped component serve as a support device for the protective shell.

4. A speaker case according to claim 2, characterized in that the shapes of the plate-shaped components and the arrangement of the pivot axes are selected so that the protective shell, in particular the rear wall, and the first and second plate-shaped component each lie with one of its side edges on one plane in the upright state, whereby the plate-shaped components and the protective shell together with the plane define a volume which is open at the opposite side of the second component, whereby the sound channel is directed into the interior of the space.

5. A speaker case according to claim 1, characterized in that the first plate-shaped component comprises several segments which are hinged together.

6. A speaker case according to claim 5, characterized in that the shapes of the plate-shaped components and the arrangement of the pivot axes are selected so that in the upright state, the protective shell, in particular the rear wall and the segments of the first plate-shaped component and the second plate-shaped component define a space which is open on the side opposite the second component, whereby the sound channel is directed into the interior of the space.

7. A speaker case according to claim 2, characterized in that the second plate-shaped component lies on the side wall of the protective shell in the upright state.

8. The speaker case according to claim 7, characterized in that the second plate-shaped component lies on the side wall of the protective shell in the upright state.

9. A speaker case according to claim 1, characterized in that the sound channel is formed as a continuous or one-sided recess of the protective shell or runs completely within the protective shell.

10. A speaker case according to claim 1, characterized in that the sound channel runs in the side wall and/or the rear wall of the protective shell.

11. A speaker case according to claim 1, characterized in that the sound channel extends over the full width of the opening for the speaker.

12. A speaker case according to claim 1, characterized in that the sound channel expands, starting from the opening for the speaker.

13. A speaker case according to claim 1, characterized in that a third plate-shaped component is hinged on the first plate-shaped component, in particular on the side of the first plate-shaped component opposite to the second plate-shaped component.

14. A speaker system comprising a mobile device having a speaker and a speaker case according to claim 1, whereby the mobile device is inserted into the protective shell of the speaker case and the opening for the speaker of the protective shell is arranged at the position of the speaker of the mobile device.

15. A speaker system according to claim 14, characterized in that the first plate-shaped component or a segment of the first plate-shaped component rests in the flat state on a display device of the mobile device.

* * * * *